INVENTOR
William Ross Aiken
BY James C. Toomey
Atty

Dec. 16, 1958 W. R. AIKEN 2,864,970

ELECTRONIC DEVICE

Filed July 11, 1955 6 Sheets-Sheet 2

INVENTOR
William Ross Aiken
BY James E. Toomey
Attys

Dec. 16, 1958 W. R. AIKEN 2,864,970
ELECTRONIC DEVICE
Filed July 11, 1955 6 Sheets-Sheet 3

INVENTOR
William Ross Aiken
BY James E. Toomey
ATTORNEY

Dec. 16, 1958 W. R. AIKEN 2,864,970

ELECTRONIC DEVICE

Filed July 11, 1955 6 Sheets-Sheet 4

INVENTOR
William Ross Aiken

BY James E. Toomey
Attys

ELECTRONIC DEVICE

Filed July 11, 1955 6 Sheets-Sheet 5

INVENTOR
William Ross Aiken
BY James E. Toomey
Attys

Dec. 16, 1958 W. R. AIKEN 2,864,970

ELECTRONIC DEVICE

Filed July 11, 1955 6 Sheets-Sheet 6

INVENTOR
William Ross Aiken

BY James E. Toomey
Attys 2,864,970

ELECTRONIC DEVICE

William Ross Aiken, Los Altos, Calif., assignor, by mesne assignments, to Kaiser Industries Corporation, a corporation of Nevada Application July 11, 1955, Serial No. 521,201

30 Claims. (Cl. 315—25)

Figures 1, 2:
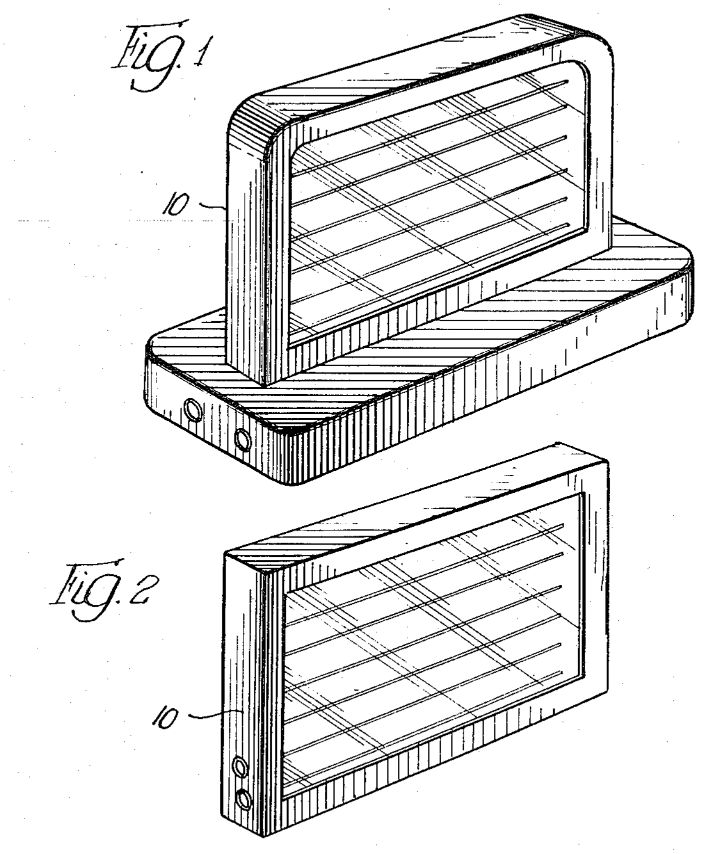

The present invention is directed to a new and novel cathode ray tube, and particularly to a novel cathode ray tube including a novel electronic scanning arrangement.

The tube of the present invention is of the revolutionary tube type known in the art as Aiken-type tube which has been disclosed in the copending applications, having Serial No. 355,965 which was filed May 19, 1953, now abandoned, and Serial No. 396,120 which was filed December 4, 1953, and which issued as Patent No. 2,795,731 on June 11, 1957. Copending application filed May 16, 1957, having Serial No. 659,677, is a continuation-in-part hereof.

The Aiken type tube, in its basic concepts, is comprised of a configuration which approximates that of a picture adapted for wall mounting. In a smaller size the tube is comparable in size and shape to a metropolitan telephone directory.

The numerous advantages and applications of the so-called flat tube are well known to parties skilled in the art. Prominent among the features and advantages attendant of this general type are its overall compactness which permits the use thereof in smaller areas; extremely high definition and resolution which results from the inherently sharp electrostatic focus arrangement; the reduction in expensive components resulting from the use of only electrostatic deflection elements, and the elimination of high voltage deflection yokes, vertical and horizontal output transformers, magnetic deflection coils, and others of the bulky and expensive components now incidental to the vertical and horizontal stages for use with cathode ray tubes now known in the art. The novel tube also is featured by the reduction in weight in its physical mass, and the minimization and simplification of adjustment of the tube for use in the desired applications; its flexibility in adaptation to mounting in various positions and in association with other equipment, and its adaptabilty for use with other types of electronic and optical units. These, and other features and advantages, have been set forth only briefly herein, and numerous other features and advantages will doubtless be apparent to parties skilled in the art.

It is likewise apparent that the novel configuration and physical characteristics of the tube lend such a unit for use in applications too numerous to set forth herein. There is, by way of example in Figure 2, a simplified version of the tube as adapted for wall mounting in the presentation of commercial television programs; for use in military applications including planes, ships, tanks, etc., for use in general instrumentation, including research and development, and in other applications too numerous to mention.

As there shown, the tube is encased in a simple housing which is adapted to be hung on the wall. Control dials may be mounted on any portion of the periphery, or alternatively may be extended by cable means to remote control positions in a manner well known in the art. As shown hereinafter, the tube may be transparent in nature whereby the unit may be readily mounted in the direct line of vision of the operator. In such event the switching equipment would be available to the operator for effecting presentation of a portion of a picture on the screen only at such times as the operator desires.

The basic unit of Figure 2 readily lends itself to use with a base mounting as in the manner shown in Figure 1. Such arrangement, of course, also has utility in commercial, laboratory and military application.

Figure 3:
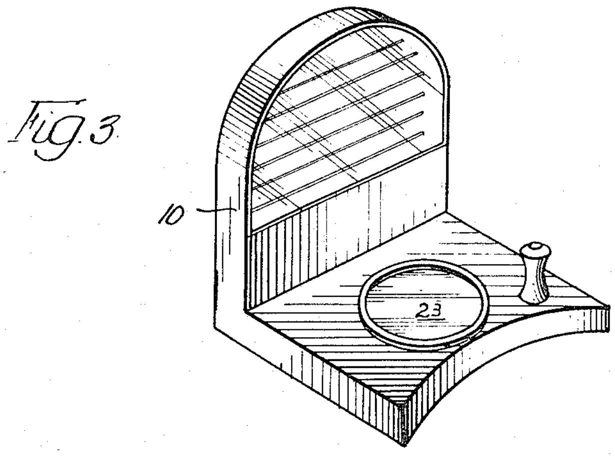

One of the many obvious military applications is set forth in Figure 3 of the drawings. As there shown, the tube is adapted to simplify aircraft instrumentation whereby in effect the complete instrument panel comprises two picture tubes, one of which is mounted in association with various switching members to provide the information in the direct line of vision of the pilot and the other of which provides the information at a convenient position relative to the control members. As there shown, the vertically mounted tube will comprise a semi-circular transparent plate which is mounted directly in front of the pilot. Switching equipment accessible to the pilot permits presentation of the altitude, speed and attitude of the aircraft on the plate as desired. Physical features such as mountains, which the pilot sees during contact flight, can be depicted artificially.

The second tube of a circular plate is mounted on a table forward of the pilot and below the first tube. The second tube will have an appearance similar to that of a radar map presenting broad physical features of the earth by analogy. Calibrations around the rim of the second tube are arranged to provide an indication of pilot information including the fuel expended, return miles to base, and other useful information. In such arrangement the pilot is presented with an analogy of the visual world which would be normally seen in clear weather.

The features, advantages, and applications set forth above are briefly exemplary, and constitute but a small segment of the whole. Others of these features and advantages and other applications will be readily apparent to those skilled in the art when reference is taken to the following description and drawings in which Figure 1 is a perspective view of the tube wherein a base mounting is employed, Figure 2 is a perspective view of the tube which is adapted for wall-mounting, Figure 3 is a perspective view of an embodiment of the tube showing a semi-circular viewing section for use in an aircraft.

Figures 4, 5, 7, 19:
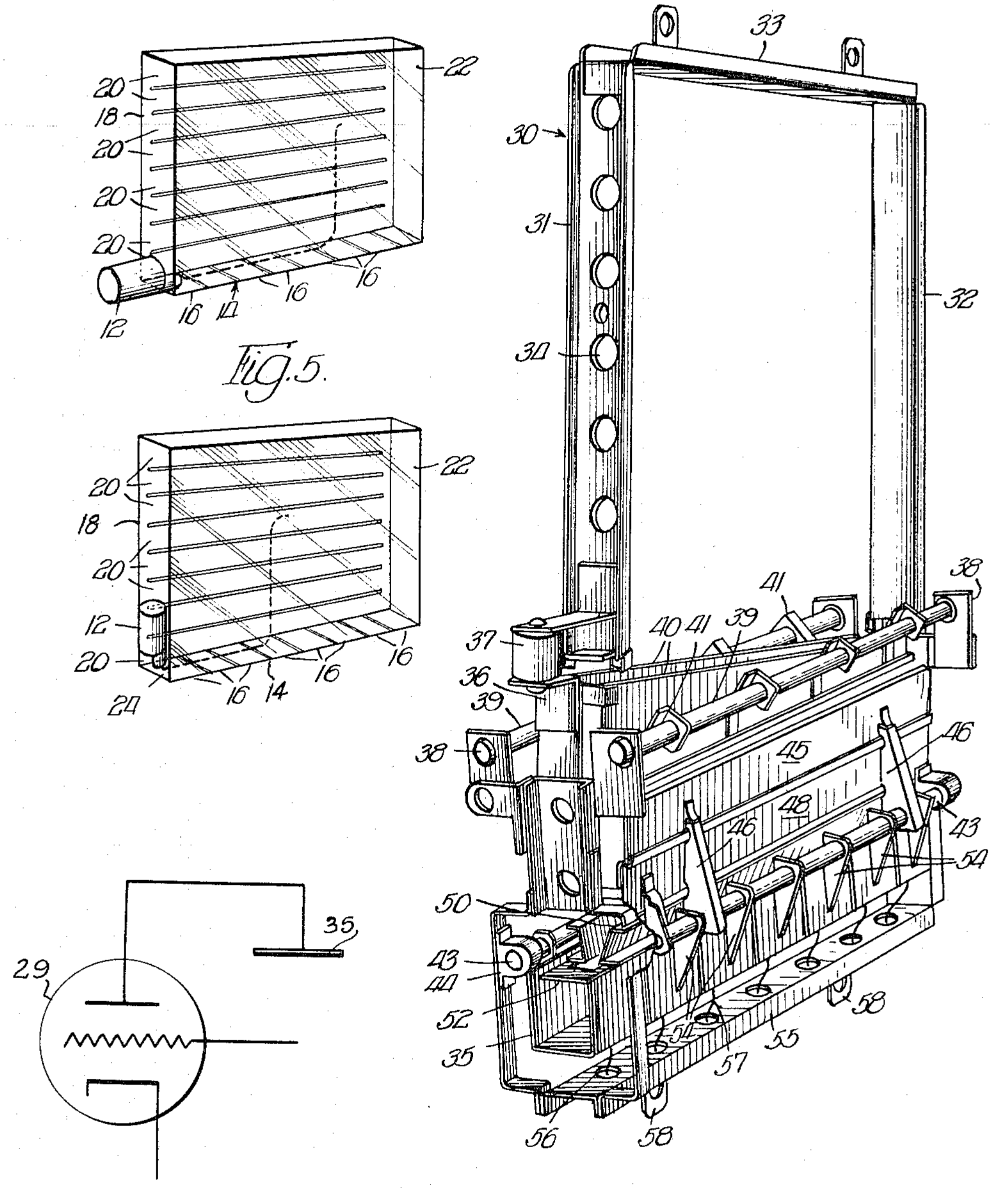
Figures 6, 17, 18:
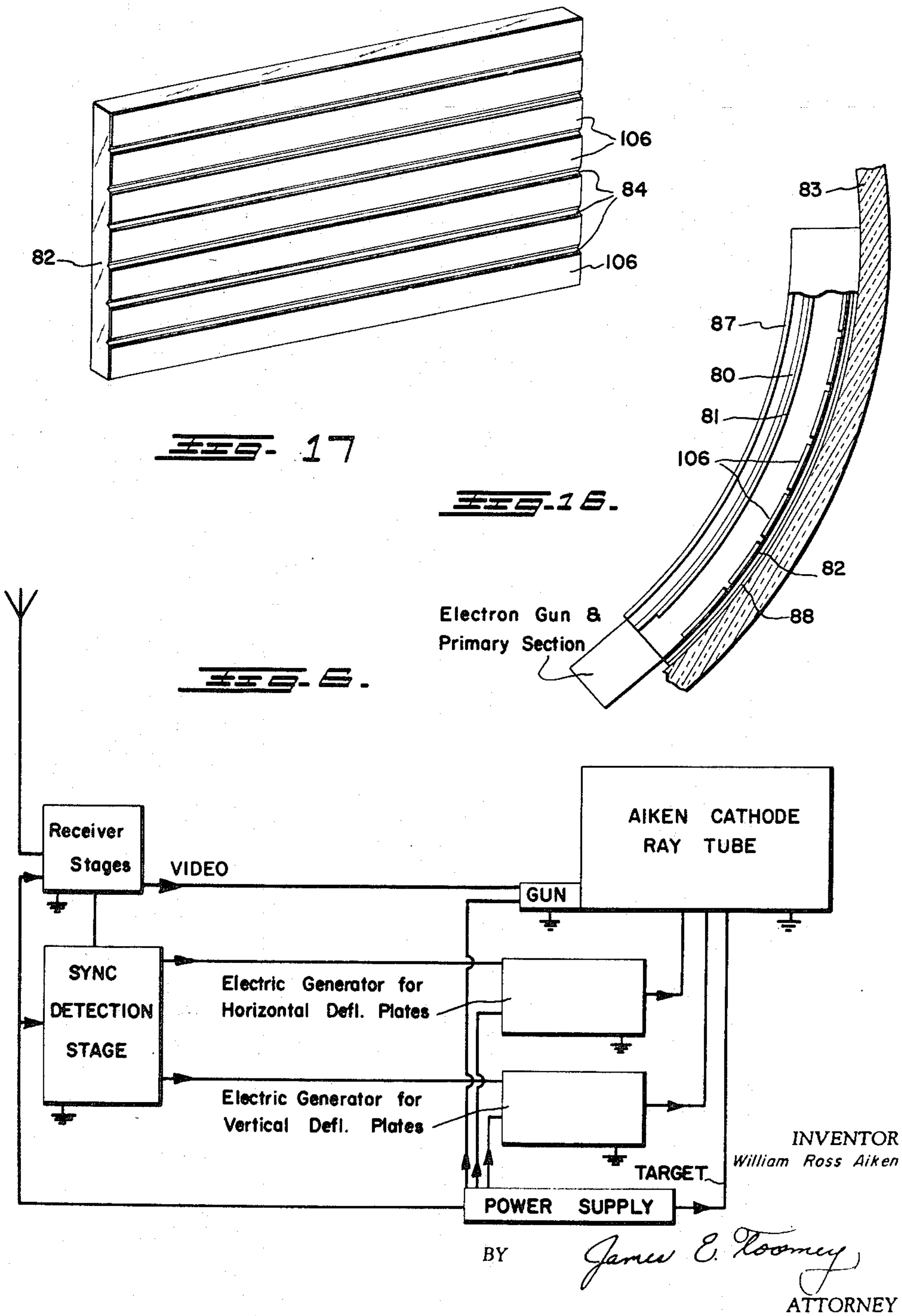
Figure 8:
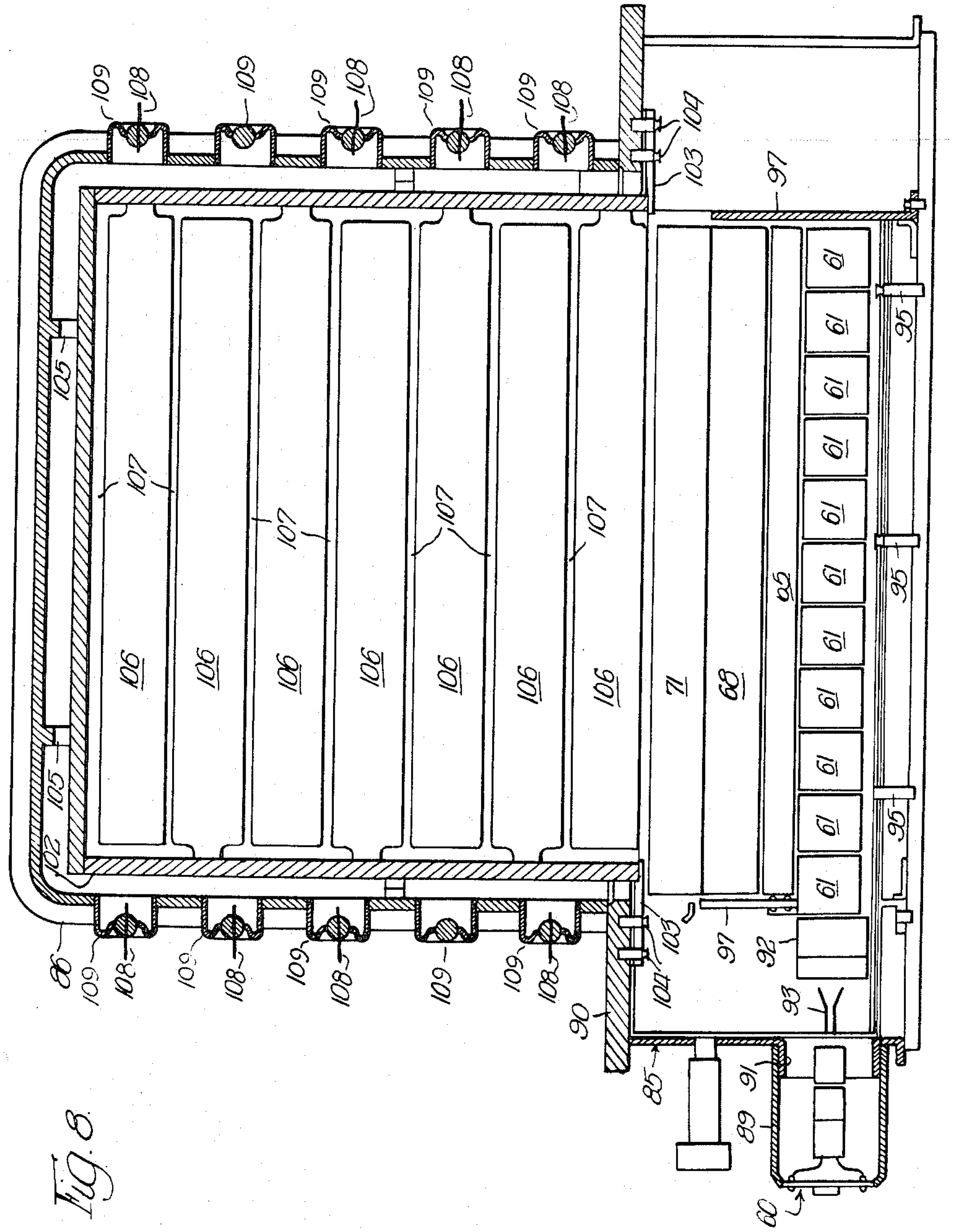
Figure 18:
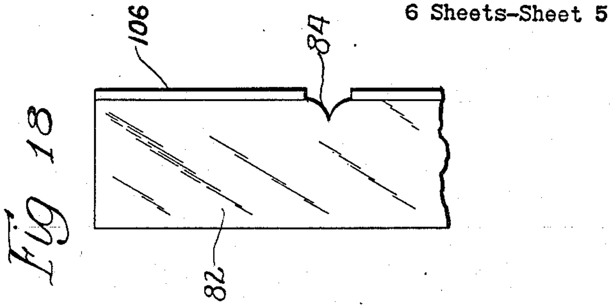
Figure 10:
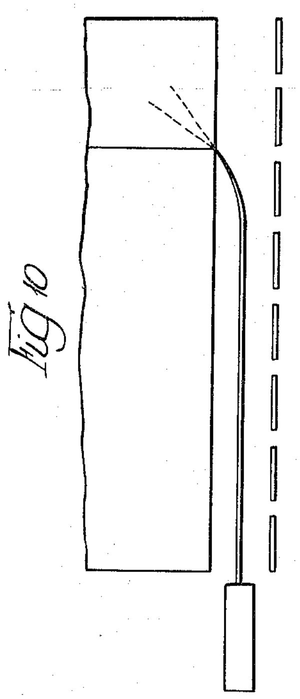
Figure 11:
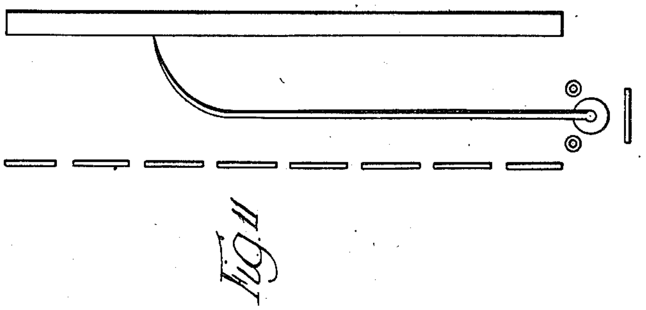
Figure 9:
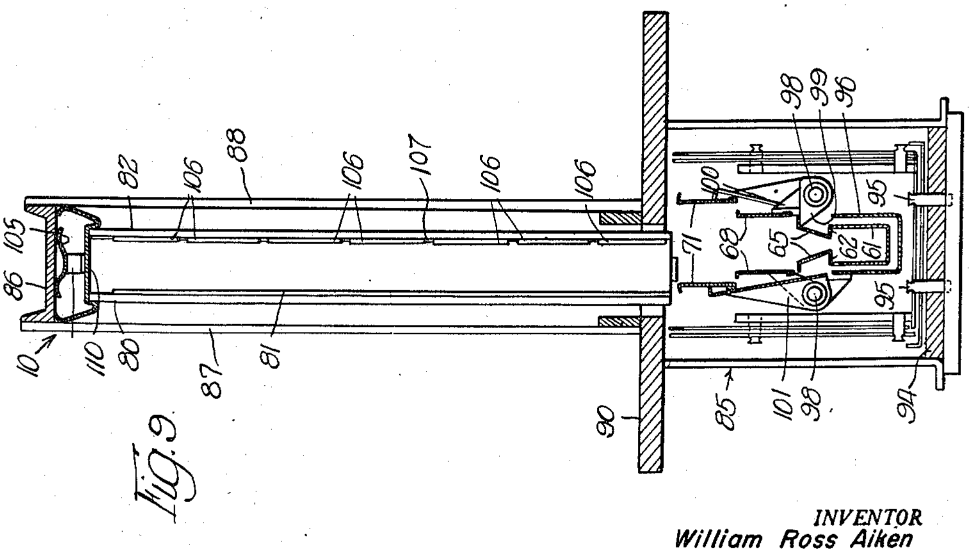
Figure 13:
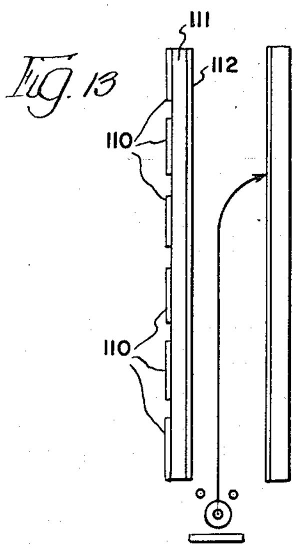
Figure 14:
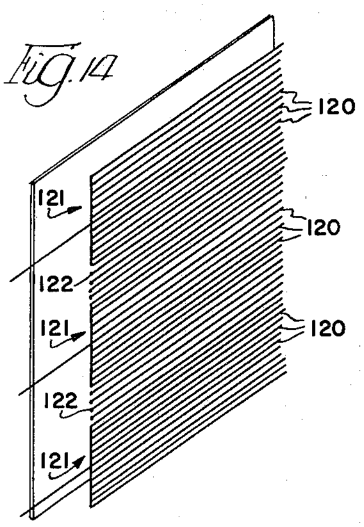
Figure 15:
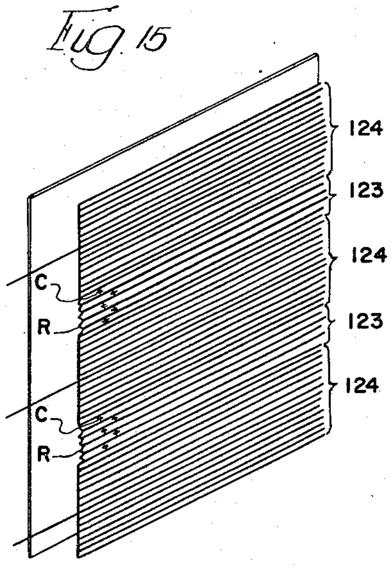
Figure 12:
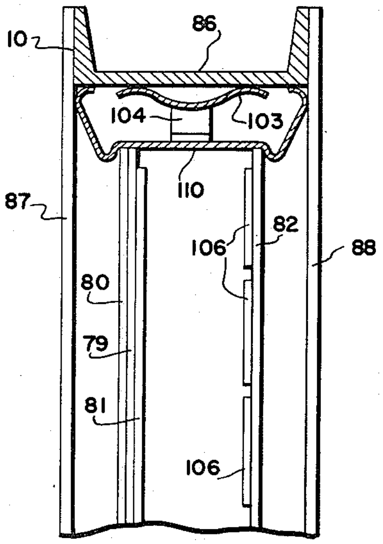

Figure 4 is a diagrammatic perspective view showing the basic components of the tube wherein the electron gun is adapted to initially deliver a beam of electrons along a path which is substantially parallel to the linear array of horizontal deflection means, Figure 5 is a diagrammatic perspective view showing the basic components of the tube where the electron gun is disposed parallel and adjacent to the vertical marginal side of the tube, Figure 6 is a block diagram illustrating an operative system employing the novel tube, Figure 7 is a perspective view of the components of the tube employing a mechanical picture straightener showing the specific electrode structures of the primary and transition sections, Figure 8 is a front view of the tube comprising the invention with portions of the housing and vacuum seals in section enabling an adequate disclosure of the internal components of the tube, Figure 9 is a side view of the tube shown in Figure 8 with portions of the housing shown in section enabling an adequate disclosure of the internal components of the tube, Figure 10 is a diagrammatic view of the relative position of the first bend affected on the electron beam by the horizontal deflection elements, Figure 11 is a diagrammatic view of the relative position of the second bend affected on the electron beam by the vertical deflection elements, Figure 12 is a cut-away side view of the tube showing an embodiment of the invention utilizing a dichroic coating on the inner surface of one of the glass plates, Figure 13 is a side view of the tube in diagrammatic form showing the vertical deflection electrodes disposed on the outer surface of the glass face of the tube, Figure 14 is a cut-away perspective view of a portion of the tube showing an alternate structure of the transparent deflection electrodes employing a plurality of fine wires connected in multiple, Figure 15 is a cut-away perspective view of a portion of the tube showing similar vertical deflection electrode structure as shown in Figure 14 wherein there is a compensating RC network between each group of wires which are connected in multiple, Figure 16 shows a modification of the novel cathode ray tube illustrated in Figures 8 and 9 particularly adapted for use in aircraft, Figure 17 is a perspective view of a modification of the glass mounting plate for the vertical deflection elements as shown in Figures 8 and 9, Figure 18 is a side view, partially cut-away of the modification shown in Figure 20, and Figure 19 illustrates the manner in which the deflection elements may be coupled to a vacuum tube.

GENERAL DESCRIPTION

The general description of the configuration and operation of the Aiken-type tube in its most basic arrangement is set forth herewith for the purpose of simplifying the explanation of the further embodiments set forth herewith in accordance with the theory of the invention. The Aiken-type tube as schematically shown in Figure 4 comprises a housing, not shown, within which are located an electron gun 12, a primary section 14, including a set of horizontal plates 16, a high voltage section 18, including a set of vertical plates 20, and a target 22.

In operation, selected areas on the phosphor screen are electronically excited by the electron beam. In the illustrated arrangements the electron gun 12 is located at the lower left hand corner of the viewing screen, and is adapted to deliver a beam along the lower horizontal edge of the phosphor screen in a field-free region adjacent the horizontal deflection plates 16. Control means effect the application of voltages in sequence to each of the horizontal deflection plates to effect bending of the beam vertically at successive points along the edge of the tube, and into the second field-free region between the transparent flat deflection plates 20 and the electrically charged screen 22.

Deflection of the beam onto the screen at the vertical level is achieved by effecting the application of voltages of appropriate values to corresponding ones of the vertical deflection plates. Thus, the position of the beam on the target may be controlled by the application of voltages to the corresponding ones of the horizontal and vertical deflection plates.

In the utilization of the equipment in the presentation of a raster, the horizontal deflection plates are energized in a sequential manner by a first set of voltages, and the vertical deflection plates are energized in sequence by a second set of voltages synchronized with that applied to the horizontal deflection plates.

In one embodiment the horizontal and vertical plates are kept at a high voltage except those opposite the position at which the beam is to be bent. In a second embodiment the horizontal and vertical plates are negative, and are synchronically energized at the point at which beam deflection is desired. It is obvious to the skilled, of course, that one set of plates may be initially negative and the other set of plates may be initially positive, in which event the beam bending signals vary accordingly.

It is obvious that in addition to the other inherent features and advantages of the Aiken-type tube, the unit includes extremely powerful focusing ability in that the convergence angle of the beam relative to the target is extremely large. Thus, beam blow-up, which increases proportionally with the distance from the source and constitutes a serious problem in the conventional type of cathode ray tube, is of little consequence in the Aiken-type tube. Additionally, the powerful focusing makes possible the presentation of a very small spot on the phosphor screen. Inherent in the provision of the fine focus is the utilization of a double bend of the beam wherein the first bend occurs in a plane parallel to the target screen, and the second bend occurs in a plane perpendicular to the screen. In this manner, the "squashing" of the beam which is effected at the point of the bend in the plane (much in the manner in which a copper tube is squashed) is offset by the force applied in accomplishing the second bend. That is, the second bend being in a plane (90°) which is applied in a direction perpendicular to the direction in which the first deflecting force was applied tends to restore the beam to its original shape, whereby a minimum amount of spot distortion occurs, and fine resolution is achieved.

Moreover, this double bend principle inherent in one embodiment of the Aiken-type tube cooperates with the bending forces to prevent beam blow-up and thereby provides powerful inherent focusing ability. Specifically, the beam is not brought down to a small spot until the second deflection force is applied very close to the screen. The convergence angle is accordingly quite large, as a result of the powerful focusing resulting therefrom, a large amount of beam current may be concentrated in a small area, and a corresponding increase in definition and brightness results. Specifically, spot size is such that a 2,000 line raster may be scanned.

The embodiment set forth in the above general description is, of course, merely exemplary of one set of operating elements which may be utilized in cooperation with the mountings shown in Figures 1–3. A mounting arrangement which is most readily incorporated in the housing of Figure 2 is illustrated in Figure 5. As there shown, the gun is mounted parallel to a vertical edge of the target, and appropriate deflection means at 24 effect an initial deflection of the beam into the field-free region extending between the edge of the phosphor screen and the horizontal and vertical deflection plates. The further operation of the elements in controlling the beam position are similar to that of the previously described embodiment.

The manner of operation of the elements in the use of the novel tube with a television receiver unit adapted to respond to commercial television broadcasts will be apparent to parties skilled in the art. Very briefly, the horizontal sync pulses obtained from the video amplifier of a conventional television receiver chassis are applied through appropriate circuitry to the horizontal deflection plates to accomplish a line sweep at the line trace in the conventional manner of approximately 260 lines per vertical sweep (assuming an interlaced trace arrangement) and the vertical sync pulses obtained from the video amplifier section of the conventional television receiver chassis are applied to the vertical deflection plates to accomplish a vertical sweep each 1/60 of a second (30 pictures per second). The video amplifier output is applied to the cathode (or grid) of the electron gun whereby variations of the gun intensity resulting from the signals received at the television receiver appear as variations in intensity of the beam on the target, and accordingly, affects the presentation of the picture transmitted by the television station.

SPECIFIC DESCRIPTION

*Cathode ray tube including physical mechanical picture straightener*

The Aiken-type cathode ray tube shown in the embodiments illustrated in Figures 1, 2, 3, 4 and 5 comprise a housing 10, an electron beam source 12, a primary section 14, including horizontal deflection electrodes 16, a high voltage section 18, including optically transparent vertical deflection electrodes 20, and a target 22.

The nature of the housing 10 may, of course, be as varied as the number of applications. The housing 10 shown in Figure 1 employs a base mounting which functions to support the high voltage or display section 18 of the tube, including the vertical deflection plates 20, and also houses the primary section, including the horizontal deflection plates 16, and the auxiliary electronic circuitry.

The housing 10 shown in Figure 2 is adapted to suitably house the components of the tube including the vertical deflection plates 20 and readily lends itself to suitable wall mounting. In such embodiment, the electronic circuitry which controls the proper operation of the tube is situated at a remote point with respect to the housing 10 and is electrically coupled thereto through suitable conducting cable means.

Figure 3 illustrates one of the applications of the tube for use in aircraft navigation. It is contemplated that the information presently displayed on a multitude of individual panel instruments is to be displayed on the two flat picture tubes. The housing 10 describes a semi-circular configuration for enveloping a semi-circular vertically mounted tube which is mounted directly in front of the pilot. Inasmuch as the vertical deflection plates 20 and the target screen 22 housed within the housing 10 are optically transparent, the pilot's visibility therethrough is not curtailed when the tube is not in operation. However, by the employment of proper switching apparatus readily acessible to the pilot, the tube operation may be commenced and the vertically mounted semi-circular flat tube, located directly in front of the pilot, will display altitude, speed and aircraft pitch and bank attitude information plus physical terrain features such as mountains—depicted artificially. Manifestly, the display will be transparent as not to interfere with the pilot's forward vision during contact flight.

The second tube 23 mounted perpendicular to the vertically mounted semi-circular tube is similar in appearance to a radar tube having a transparent map disposed in superposition with respect to the face of the tube. By proper energization of the tube, a pictorial presentation will present the broad physical features of the earth below in a manner somewhat similar to that of a conventional radar map. This horizontal display will also show necessary navigation and traffic control information plus distance to base, fuel remaining and similar data. Switches are provided which enables the pilot to select and display only the information needed at the time, or situations as take-off, cruise, landing, etc.

The tube, as diagrammatically shown in Figures 4 and 5, show the tube which consists of a phosphorous screen sandwiched between two rectangular glass plates. The entire unit as in the other control tube is sealed and evacuated. Transparent phosphors are employed which enable the viewer to look through the tube. The tube illustrated in Figure 4 shows an electron gun 12 which injects or directs a beam of electrons along the horizontal edge of the tube. The electron beam flows undeflected in a field-free region adjacent to a row of horizontal deflection plates 16 mounted transversely along the edge of the tube. By controlling the voltages applied to the horizontal deflection plates 16, the beam can be caused to bend upwardly at any desired position across the tube. The electron beam then flows vertically in another field-free region past a series of vertical transparent deflection plates 20. By applying appropriate voltages to these vertical deflection plates 20, the electron beam can be deflected at any desired height toward the front phosphor target screen 22, positively charged to attract the beam. Wherever the beam hits or impinges upon the screen 22, it exhibits small spots of light that collectively make-up a resultant picture. Thus by changing the voltages on the horizontal and vertical deflection plates 16 and 20 respectively, in suitable sequence and synchronism, the electron beam can be caused to scan the front face of the tube in much the same way as a conventional picture tube is scanned.

Figure 5 shows a more compact arrangement of the components of the tube wherein the electron gun 12 is disposed adjacent and parallel to the vertical marginal edge of the target screen. The electron gun 12 delivers a beam of electrons along a path which is initially perpendicular to the linear array of horizontal deflection plates 16 and is caused to bend through substantially 90° in a direction toward the horizontal deflection plates 16. The beam then enters the field-free region adjacent the horizontal deflection plates 16 until suitable voltages applied to the horizontal deflection plates 16 cause the beam to bend upwardly. The electron beam then flows vertically in another field-free region past the series of vertical deflection plates 20. By applying appropriate voltages to the vertical deflection plates 20, the electron beam will be deflected at any desired height toward the front phosphorous screen 22.

A system employed to satisfactorily energize and operate the Aiken-type tube comprising the invention is illustrated in block form in Figure 6. The system shown in Figure 6 could also manifestly be of the closed television circuit type. Prior to proceeding with the specific detailed description of the Aiken cathode ray tube, it is well to summarize the operation of a complete unit. This may be accomplished by following a signal through the system shown. The antenna receives both the sound and the picture or video signals, which are applied to the receiver stages of the television receiver by a suitable transmission line. For purposes of simplification only the video portion of the receiver is shown and described. The video signal is passed to the electron gun from the receiver stages. Also, the receiver stage is adapted to pass a signal to the sync detection stage. The sync detection stage separates the horizontal and vertical pulses and passes them on to the respective electric generators which in turn properly energizes the horizontal and vertical deflection means of the cathode ray tube. These pulses control the operating frequencies of the generators for the horizontal and vertical deflection elements, in order to keep them in step with the transmitter. In this way, the electron beam in the tube is synchronized with that in the camera tube at the transmitter.

As the beam in the tube scans the target area of the tube, the signal on the grid of the electron gun produces the proper variations in the beam intensity and so reconstructs the television picture element by element and line by line.

A power supply is provided to apply suitable operating potentials to the electric generators for the horizontal and vertical deflection plates, the electron gun, the receiver stages, sync detection stage, and the target.

There is illustrated in Figure 7 an assembled composite unit of the components of the tube which are operative to cause the electron beam to be deflected from its initial path of travel as the beam is emitted from the electron gun to a path which is substantially perpendicular to the initial path and substantially parallel to the fluorescent target. An upper frame 30 is provided having two vertical side members 31 and 32 in substantially parallel relation with respect to one another and a top horizontal member 33. The frame 30 is capable of maintaining a proper spaced relation between a fluorescent target and a plurality of optically transparent deflection electrodes which will be described in more detail hereinafter with reference to Figures 8 and 9. The vertical side member 31 of the frame is provided with a plurality of apertures 34 positioned in a manner such as to be capable of receiving electrical conducting wires for suitably energizing the transparent deflection electrodes from a source of potential outside the tube.

Another portion of the composite unit, referred to as the primary section, comprising the horizontal deflection plates 35 and a transition section is disposed in insulatingly spaced relation with respect to the upper frame 30. There is provided a base frame 36 to which is fastened the electrode structures comprising the primary section and the transition section. The base frame 36 is insulated from the upper frame 30 by a pair of insulating members 37, only one of which member is shown in the drawing; however, it will be easily discerned that the other insulator is disposed in a like manner with respect to the opposite vertical side member 32 of the upper frame 30. The vertical members of the base frame 36 are provided with outwardly extending flanges 38 having apertures formed therein for receiving a pair of rigid insulating supporting rods 39.

A pair of substantially triangular electrodes 40 having apertured outwardly extending flange supporting means 41 which are spaced from one another and supported by the insulating rods 39. The apertures of the flanged supporting means 41 are of a diameter suitable to snugly engage the insulating rods 39 and thereby positively maintain the relative position of the triangular electrodes 40 with respect to one another. The triangular electrodes 40 are suitably energized from a source of potential outside the tube wall through any suitable electrical conductors.

Another pair of rigid supporting rods 43 formed of an insulating material is secured to the base frame 36 by means of inwardly extending ears 44 having apertures formed therein for positively receiving and maintaining the rods 43 in a given fixed position.

A pair of relatively flat electrodes 45 is disposed in spaced and co-extensive relation with respect to the triangular electrodes 40 and is maintained in such relation by support arms 46 which are secured to support rods 43. One of the terminal portions of the arms is suitably fastened to the electrodes while the opposite terminal portion is provided with an aperture capable of snug engagement about the insulating supporting rods 43. Potential is applied to the electrodes 45 from a source of potential outside the tube through any suitable electrical conductors.

A second pair of relatively flat electrodes 48 is spaced from and in co-extensive relation with respect to the electrodes 45 and spaced from one another by a slightly lesser dimension than the spacing between the electrodes 45. The electrodes are maintained in fixed position by means of downwardly extending arms 46. One of the terminal portions of the arms 46 is suitably fastened to the side wall of the electrodes 48, while the opposite portion is provided with apertures capable of snugly engaging the insulating rods 43.

The above cited electrode assembly, including the triangular electrodes 40 and the two pairs of electrodes 45 and 48, together comprise an assembly which hereinafter will be referred to as the transition section.

Beneath and slightly spaced from the transition section, there is disposed an assembly of electrodes herein referred to as the primary section. A skirted electrode 50 assembly is disposed directly beneath the electrodes 48 in co-extensive relation with respect thereto and is maintained in a fixed and spaced relation therewith by supporting means. Suitable electrical conducting wires are employed to energize these electrodes from a source of potential outside the tube wall.

A slotted electrode 52 is disposed directly beneath the skirted electrode 50 and maintained in fixed spaced relation therewith by supporting means. The slot formed in the electrode is substantially co-extensive with the skirted electrodes 50 and is positioned in a manner such that the center line thereof corresponds to the center line for the skirted electrodes 50. The slotted electrode 52 is maintained at the desired potential through a suitable electrical conductor.

A plurality of generally U-shaped horizontal deflection electrodes 35 is disposed such that the open side of each electrode is closely adjacent and slightly spaced from the slotted electrode 52. The horizontal deflection electrodes 35 are suitably maintained in a given fixed position by means of supporting members 54 which are fixedly attached to the rigid insulating rods 43 by means of apertured portions which snugly engage the supporting rods 43.

The base frame 36 is provided with a substantially horizontal member 55 having apertures 56 formed therein capable of receiving the individual conducting wires 57 which energize the individual deflection electrodes 35 from a source of energizing potential outside the tube. Also, it will be noted that the member 55 is provided with downwardly extending ears 58 having apertures formed therein which are fastened to the tube envelope to rigidly secure the assembly in a fixed position therewithin.

It will be readily discernible that an electron gun may be mounted in any of the conventional manners in order to deliver a beam of electrons along a path through the channel formed by the horizontal deflection electrodes 35. In order to clearly illustrate the internal electrode structure of the cathode ray tube, it was deemed inadvisable to show the electron gun. However, for purposes of explanation, the electron gun may be mounted adjacent the left hand corner of the unit as shown in Figure 4.

In operation of the embodiment shown in Figure 7, an electron gun directs a beam of electrons toward and through the channel formed by the horizontal deflection plates 35. The horizontal deflection plates 35 and the slotted electrode 52 are, for example, maintained at 800 v. positive potential with respect to the cathode potential of the electron gun whereby a field-free region is established within the channel. Obviously, the electron beam may travel the entire length of the channel formed by the horizontal deflection plates 35 and electrode 52 without being affected in any way by spurious electrostatic fields. In order to cause the beam to be deflected from the path in a direction substantially perpendicular to the initial direction of travel, a suitable potential negative with respect to the cathode potential of the electron gun is applied to one of the horizontal deflection plates which establishes a negative field in the region thereof causing the beam to be deflected thereby and therefrom. The electron beam is caused to travel through the slotted electrode 52 and between the skirted electrodes 50, the electrodes 48 and 45 and the substantially triangular electrodes 40. In one successful operation of the structure, the skirted electrode 50 was maintained at 1200 volts potential; the electrodes 48 at 2000 volts potential; and the electrodes 45 within the range of from 0 to 8000 volts potential. It must be understood that the electrostatic fields established by the aforementioned electrodes cause the electron beam passing therethrough to be focussed or compressed in a single plane. In the presentation of a raster on the target of the tube in one embodiment, the deflecting forces are initially applied to the horizontal deflection plate closest to the electron gun, and simultaneously to the top vertical deflection plate (the vertical deflection plate farthest from the beam source), whereby the beam is bent into registration with the upper left hand corner of the target. Successive energization of the horizontal electrodes establishes a linear trace across the top marginal edge of the target face. As the negative potential applied to the top vertical plate is increased, the beam is bent at a greater angle, whereby the next line of the raster may be traced by further cycling of the horizontal deflection plates. The manner in which a frame scan is accomplished by synchronized energization of the horizontal and vertical deflection plates in this manner will be readily understood by those skilled in the art.

It will be also apparent to parties skilled in the art of electron lens design that a variation of the value of potential applied to the electrodes 45, 48 and 50, and the spacing of the electrodes will vary the point of the focussing of the beam in the plane of initial deflection. It is noted that the focus achieved is far in excess of that available in cathode ray tubes now commercially available. However, if a finer degree of focus is desired, the point of focus in the initial plane can be varied by affecting a corresponding variation in the value of the potential signal applied to the focussing electrodes.

Inasmuch as the beam bending achieved by the primary section may be less than 90°, the resultant picture frame may approximate the shape of a parallelogram. According to the invention, the picture may be straightened to approximate a rectangle by means of an electronic picture straightener or by a mechanical picture straightener which is set forth hereat. The embodiment shown in Figure 7 is exemplary of a mechanical picture straightener which may be used for such purpose.

In more detail, the primary section is tilted slightly with respect to the upper frame assembly as shown in the drawing so that the resultant image exhibited on the target will approximate a rectangle rather then a parallelogram. It will be easily discerned that if the frame assembly were not tilted in this manner the picture shape would approximate a parallelogram, that is, the electron beam even subsequent to its deflection by the horizontal deflection electrodes has a velocity factor in the direction of its initial travel as it is emitted from the electron gun. Accordingly, when the deflecting force established by the horizontal deflection electrodes 35 is imposed on the beam, the beam is caused to be deflected upwardly. However, there are two forces acting on the beam subsequent to its deflection by the horizontal deflection plates 35 which can be expressed as one force acting on a beam in a direction of its initial travel and another force acting on the beam in a direction perpendicular to the initial direction of the beam travel. Although the force acting on the beam in a direction perpendicular to its initial direction of travel is substantially greater than the other force, the other force is nevertheless present. By combining the force vectors we find the beam would be traveling in a direction which is not perpendicular to the initial direction of travel but at some angle with respect thereto. In order to correct for the obvious disadvantage, the primary section is slightly tilted causing the beam travel to be in a direction substantially perpendicular to the lower marginal edge of the upper frame 30, which is adapted to position the target, resulting in a rectangular raster presentation on the target area.

The operating example described hereinabove assumed that initially the horizontal deflection electrodes 35 were to be maintained at 800 volts positive potential with respect to the cathode potential of the electron gun. However, it is advantageous in certain arrangements to reverse this procedure in order to reduce the power requirements necessary to vary the deflection voltages of the horizontal deflection electrodes 35. In such arrangement, the horizontal deflection plates are initially maintained negative with respect to the cathode potential of the electron gun, and the deflection of the beam is commenced by the plate closest to the electron source. In operation, all plates 35 are negative with respect to the beam and are selectively caused to be driven positive starting with the horizontal plate 35 which is closest to the source. Thus as a line trace is initiated, the beam "sees" the first horizontal deflection plate 35 which is negative and the beam is deflected into the area between the target and the deflection plates. As the first plate goes more and more positive, the bending force applied to the beam decreases less and less, and the beam moves through the area which is coextensive with the horizontal plates. As the first plate is driven to a positive potential value approaching a value equal to the value of the potential impressed on the slotted electrode 52, a field-free region is established thereby allowing the beam to pass to the region defined by the next adjacent horizontal deflection electrode which is still a negative potential value with respect to the beam. The beam upon "seeing" the negative field of the next adjacent horizontal deflection plate will be deflected thereby until the plate is driven to a positive value substantially equal to the slotted electrode whence the beam will travel to the third horizontal deflection plate and will be deflected thereby. This action continues until each plate has acted upon the beam.

At the instant the plate farthest from the electron source has caused the beam to be deflected, a sync signal blanks the beam and all the horizontal deflection plates 35 are driven negative with respect to the beam in preparation of the tube for another sweep of the beam in a like manner. The time interval for the plates 35 to be driven negative with respect to the beam after a complete sweep is referred to as the retrace period.

The foregoing description has been offered for the purpose of presenting the more basic concept of the tube operation. However, in actual operation, the deflection elements, both horizontal and vertical, of the tube may be energized in a so-called overlapping manner. For purposes of illustration reference will be made to the horizontal deflection means comprising plates 35, but it is to be understood that the same procedure may be employed in connection with the vertical deflection system which system is described in connection with Figures 8 and 9.

Briefly, the signals applied to the deflection plates 35 are applied in an overlapping manner whereby a signal is applied to the first plate and then applied to the next adjacent plate prior to the instant the first plate approaches its fully charged state (full negative or full positive, depending upon the system employed). The same procedure is repeated along the entire array of plates so that the voltage on at least several adjacent plates is changing at the same time.

It is deemed advisable to point out that for large cathode ray tubes of the instant type in which high current beams are employed, it has been indicated that it may be desirable to re-focus the low voltage beam as it travels through the horizontal deflection electrodes of the primary section. One method of achieving the desired result is to connect every other deflection electrode and the slotted electrode adjacent thereto to a different voltage than the intermediate deflection electrodes and their respective sections of the slotted electrode. Thus each section formed by a deflection electrode and its respective section of the slotted electrode becomes a section of a lens system which may be repeated the entire length of the primary section. Manifestly, suitable electronics must be provided to restore the various electrodes to proper voltage values prior to the instant the beam is deflected at that part, as will be apparent to parties skilled in the art.

In one novel embodiment of the invention, the deflection plates, both horizontal and vertical were energized in an "on-off" manner wherein the deflection elements 35, for example, were each electrically coupled to a source of voltage through a triode vacuum tube 29 as shown diagrammatically in Figure 22.

The deflection elements of the novel tube may be energized by coupling them in groups or separately to a source of potential through mechanical switches or electronic counters to a voltage source.

Now reference will be made to Figures 8 and 9 which show another embodiment of the cathode ray tube comprising the present invention. The embodiment of Figures 8 and 9 shows a tube structure wherein the primary section is disposed in parallel relation with respect to the target area. An electronic picture straightening means can be satisfactorily employed with such arrangement.

It will be noted by a comparison of the structure shown in Figures 8 and 9 with that of Figure 7 that the structures are substantially identical with the exception of the elimination of the triangular electrodes of Figure 7. The embodiment shown in Figures 8 and 9 shows the so-called Aiken-type cathode ray tube wherein the primary section is disposed at the bottom of the display or high voltage section. An electron source 60, which may be standard or conventional cathode ray tube electron gun employing electrostatic focus and equipped with electrostatic deflection plates, is disposed so as to be capable of delivering a beam of electrons into an electrode array referred to as the primary section. The primary section comprises a linear array or plurality of generally U-shaped deflection plates 61 forming an open sided channel through which the electron beam is caused to travel. Disposed along the open side of the channel formed by the U-shaped deflection plates 61, there is a slotted electrode 62 which is substantially co-extensive therewith. Directly above and slightly spaced from one another, there are disposed three pairs of focusing electrodes 65, 68 and 71 which are substantially co-extensive with the deflection plate array and are in parallel relation with respect to the axis of said array. The electrodes 68 and 71 comprise a group of electrodes referred to as the transition section.

A high voltage section or display section is disposed immediately above the primary section. The high voltage section comprises two glass plates 80 and 82 having optically transparent electro-conductive coatings applied to their opposed surfaces. One of these plates is completely coated and carries a layer of material 81 which exhibits fluorescence upon electron impingement thereon. The surface of the other glass plate is coated with alternate strips 106 of optically transparent material having high electro-conductivity and relatively low resistivity and strips 107 of material of extremely high resistivity and low conductivity interposed between the first mentioned strips 106. The conducting strips 106 on the surface of the glass plate 82 are operative to cause the electron beam (which is deflected into the area between the strips 106 and the target 80 by the channel shaped aray of electrodes 61 of the primary section) to be deflected and to impinge upon the fluorescent coating 81 of the glass plate 80.

It will be noted from an examination of Figures 8 and 9 that there is a metal housing 85 for the components of the primary section and a metal frame 86 for the high voltage or display section integral with the housing 85. Plate glass face plates 87 and 88 are sealed to the metal frame 86. The electron gun 60 is mounted in a standard glass neck 89 at the lower left hand corner of the metal housing 85. External flanges 90 are provided and extend a sufficient distance outwardly from the entire assembly so that the assembly could be mounted within a slot formed in the top of a table. The external flanges 90 are adapted to rest about the marginal edges of the slot thereby exhibiting only the display section with the electron gun 60 and primary section hidden from sight beneath the top surface of the supporting table.

The metal housing 85 is provided with an outwardly extending flange annulus 91 adapted to engage the inner surface of the glass neck 89 which houses a portion of the electron gun 60. The horizontal deflection plates 92 and the vertical deflection plates 93 of the electron gun 60 are positioned within the region defined by the metal housing 85. An insulating member 94 disposed adjacent the inner horizontal surface of the metal frame 85 is provided with apertures adapted to receive a set of metal pins 95. The mounting pins 95 are provided to support an internal structure comprising an electromagnetic shielding means preferably formed of a mu-metal or other like material having high permeability. The internal structure acts to properly shield the primary section and effectively eliminates the passage of any electromagnetic fields established within this section therethrough, and effectively eliminates the effects of any exterior fields established by associated apparatus in close proximity to the primary section from penetrating therethrough.

An elongate channel member 96 is provided to be mounted within the shielding structure and is adapted to suitably support the electrodes of the primary and transition section. The horizontal deflection plates 61 of the primary section are disposed in alignment and spaced from one another in co-extensive and spaced relation with respect to the elongate channel 96. Each of the horizontal deflection electrodes 61 is generally U-shaped in cross-section and the entire assembly defines a channel which is co-extensive with the elongate supporting channel 96. The horizontal deflection electrode most removed from the electron gun 61 has a back plate formed as an integral part of its structure and is operative to militate against the passage of any electrons beyond this point.

Upstanding mounting plates 97 are provided to suitably secure the terminal portions of a pair of rigid insulating rods 98.

It will be noted that in the embodiment illustrated in Figures 8 and 9, the horizontal deflection electrodes 61, the slotted electrode 62 and the skirted focusing electrode 65 are formed as a composite unit wherein each electrode is properly insulated from the others in order that separate potentials can be applied simultaneously to each. The rigid insulating rods 98 are provided with radially extending arms 99, the terminal portions of which are suitably fastened to the assembly comprising the horizontal deflection electrodes 61, the slotted electrode 62 and the skirted focusing electrode 65 by spot welding or any other suitable means. The arms 99 are operative to fixedly maintain the relative position of the aforementioned assembly of electrodes with respect to the other electrodes of the primary section.

The pair of focusing electrodes 68 is disposed directly above the skirted focusing electrode 65 and maintained in spaced relation therefrom by radially extending arms 100 which are mounted on the rigid insulating rods 98. Another pair of focusing electrodes 71 is maintained in fixed position above the pair of focusing electrodes 68 by radially extending arms 101 which are likewise mounted on the rigid insulating supporting rods 98. The last mentioned pair of focusing electrodes 71 is spaced apart from one another slightly in excess of the spacing of the pair of focusing electrodes 68.

The high voltage or display section of the cathode ray tube is supported by a substantially rectangular frame 86 having apertures formed therein along the vertical side wall thereof.

Glass face plates 87 and 88 are disposed on opposite sides of the frame 86 and are sealed thereto by forming a metal to glass seal around the entire periphery thereof. An inner frame 102 is disposed within the region defined by the aforementioned frame 86 and the glass face plates 87 and 88, and is supported therein by inwardly extending arms 103 which are fastened to the metal housing 86 by mounting pins 104. In order to maintain the spaced relation of the inner frame 102 with respect to the outer frame 86, a plurality of metal detents 105 are provided and disposed about the peripheral portions of the inner frame 102 in intimate spring contact with the inner surface of the outer frame 86.

An optically transparent glass plate 80 is disposed on one side of the inner frame 102 and carries a coating of fluorescent material 81 on the inner surface thereof. The coating 81 is maintained at a suitable positive potential with respect to the cathode potential of the electron gun through a conducting medium not shown. Another glass plate 82 is disposed on the other side of the inner frame 102 and carries a coating comprising a plurality of strips 106 of electrically conductive optically transparent material on its inner surface thereof. An optically transparent material 107 having high resistance characteristic or properties may be applied to the surface of the glass plate 82 between each pair of adjacent vertical conducting strips 106. The strips 106 act as vertical deflection electrodes and are formed of an electrically conductive material having characteristics of optical transparency. The high resistance coating 107 applied between each pair of adjacent vertical deflection electrodes 106 is formed of a stannic chloride solution.

It has been found that by spraying a solution consisting of ten parts of stannic chloride, one part methanol, and one part water on the glass plate which plate has been raised to a temperature of 500° C. and allowing the plate and the coating to cool to room temperature and repeating the heat cycle four or five times, the resultant coating will exhibit very satisfactorily electrical characteristics. The resistance can in this manner be raised to over 200 megohms per square. It is sometimes desirable to have a coating of high resistance material between the vertical deflection electrodes 106 in order to provide a leakage path for any electrons which might impinge thereon and would otherwise tend to establish a spurious unwanted electrostatic field. The vertical deflection electrode may be formed of any optically transparent material, such as glass for example, which is capable of electrical conductions. It will be noted that each of the vertical deflection electrodes 106 is energized from a source of potential outside the frame 86 through their respective conducting wires 108. The wires 108 are passed through the tube wall through vacuum seals 109 which are in vacuum type sealing relation with respect to the apertures formed in the frame.

The inner assembly comprising the glass plates 80 and 82 and the inner frame 102 are maintained within the region defined by the outer frame 86 and the glass face plates 87 and 88 against lateral movement with respect thereto by a channel member 110 having an outwardly extending portion which is in intimate contact with the inner surface of the glass face plates 87 and 88.

In operation, the electron gun 60 upon suitable energization, causes an electron beam to be delivered along a path which is in substantial parallel alignment with a longitudinal axis of the linear array of horizontal deflection plates 61. As an aid to rapid assembly, the beam source may include a conventional electron gun 60 having horizontal and vertical deflection plates 92 and 93, and the beam may be centered by proper energization of the horizontal and vertical deflection plates 92 and 93, respectively.

For purposes of illustration, it will be assumed that all the horizontal deflection electrodes 61 are initially maintained at some negative potential with respect to the cathode potential of the electron gun 60. Accordingly, as the beam enters the region defined by the electrostatic field established by the horizontal deflection electrode 61 most adjacent the source of electrons, the repelling force of said field will cause the beam to be deflected upwardly in a direction away from the horizontal deflection electrodes 61. In the embodiment disclosed in Figures 8 and 9, a display, which is rectangular in shape, is obtained on the fluorescent target 81 by mixing a portion of the vertical sawtooth sweep signal from the electric generator for vertical deflection plates with the sawtooth sweep signal from the electric generator for the horizontal deflection plates prior to the application thereof to the horizontal deflection electrodes 61. A circuit operable to provide the desired results is taught in copending application Serial No. 659,677, which was filed May 16, 1957; and reference is made thereto for a more complete disclosure of the circuit operation.

The equal potential lines are established within the horizontal deflection electrodes 61 and assume generally U-shaped curvatures which act to focus the electrons of the beam in the region of the open sides of the horizontal deflection electrodes 61 and cause the electrons to pass through the slotted electrode 62. The beam is then caused to be passed through the skirted focusing electrode 65 which electrode acts to further focus the beam. The skirted electrodes in one successful embodiment was maintained at 1200 volts potential negative with respect to the cathode potential of the electron gun.

The beam is next caused to pass through the two pairs of focusing electrodes 68 and 71, the first of which was maintained at 2 kv. and the next of which was maintained within the range from 0 to 8 kv. These focusing electrodes establish electrostatic fields which accelerate the beam into and focus the beam at a point in the high voltage region established between the fluorescent coating 81 on the glass plate 80 and the vertical deflection plates 106 on the glass plate 82. It is apparent to the skilled that various values of potential may be applied to these elements to suit the focus of the beam to the nature of the use, although specific potential values used in a successful embodiment are set forth hereat. As in the first embodiment a variable potential signal may be applied to the focusing electrodes which provides a variable point of focus in the space between the target and the deflection plates. Thus, by synchronizing the variable signal with the frame trace, the point of focus of the beam may be made to occur at the point of its second bend. As noted before, the fine focusing of the system is much superior to known types of arrangements and accordingly, such modification is not necessary to the use of the cathode ray tube in conventional applications such as television.

In the high voltage section the vertical deflection plates 106 and the phosphor target area 81 were both maintained at substantially 13 kv. to establish a field-free region therebetween. The beam will now be caused to travel within the field-free region until a suitable negative potential is applied to one of the vertical deflection plates 106 at which time the beam will be caused to be deflected toward and impinge upon the fluorescent material 81 on the glass plate 80. When the electrons impinge upon the fluorescent material 81, the material becomes excited thereby and will emit light having an intensity directly proportional to the intensity of the impinging electron beam. Obviously, inasmuch as the vertical deflection plates 106 and the supporting plate 82 are optically transparent, the light emitted by the fluorescent coating 81 may be viewed through the glass plate 82 upon which the vertical deflection plates 106 are applied. Manifestly, deflection of the beam onto the target screen 81 at the vertical level is achieved by effecting the application of voltages of the appropriate values to corresponding ones of the vertical deflection plates 106. Accordingly, the position of the beam impingement on the target may be controlled by the application of voltages to the corresponding ones of the horizontal and vertical deflection plates in synchronism.

In each embodiment of the invention as shown in detail in Figures 7, 8, and 9, the primary section and the transition section are so disposed relative to the display section including the fluorescent coated target plate that the beam of electrons delivered therethrough is caused to be directed in a plane substantially parallel to and only slightly spaced from the vertical deflection plates. Upon particular and specific examination of the device illustrated in Figure 9, the relative position of the primary section and the transition section and the display section will be readily discernable.

It is deemed timely at this point in the description of the operation of the novel cathode ray tube to note that, in addition to those characteristics heretofore pointed out, the device incorporates inherent extremely powerful focusing ability in that the convergence angle of the beam relative to the target is extremely large. Thus, beam blow-up, which normally occurs in the conventional type cathode ray tube, is inconsequential in the Aiken-type tube comprising the present device. The powerful focusing again makes possible the presentation of an extremely small spot of light emitted from the fluorescent screen.

Inherent in the provision of the fine focusing characteristics is the imposition on the electron beam of forces causing the beam to bend through substantially ninety degrees twice, wherein the first bend of the beam occurs in a plane parallel to the target screen 81, and the second bend occurs in a plane perpendicular to the target screen 81.

Figure 10 illustrates diagrammatically the relative position of the first bend effected on the beam by the horizontal deflection electrodes and Figure 11 illustrates diagrammatically the manner and relative position of the effected second beam bend which is caused by the field established by the vertical deflection electrodes. It will be noted that the beam is focussed in one plane in Figure 10 and in a plane perpendicular thereto in Figure 11. In this manner, the "squashing" of the beam which is effected at the point of the bend in the plane is offset by a like "squashing" effect which is accomplished in the second bend. That is, the second bend being in a plane which is perpendicular to the first bend tends to restore the beam to its original shape, whereby a minimum amount of spot distortion occurs, and fine resolution is achieved. Manifestly, the double bend principle inherent in the present device eliminates the problem of beam blow-up and thereby provides a powerful focusing ability. Specifically, the beam is not brought to a small spot until the second deflection force imposed thereupon is applied very close to the fluorescent coating of the screen, and the convergence angle is accordingly quite large. As a result of the powerful focusing, a relatively large amount of beam current may be concentrated in a small area, and a substantial increase in definition and brightness for corresponding spot sizes is effected.

Figure 12 shows an embodiment of the invention employing a dichroic coating 79 preferably on the surface of the glass plate 80 of the tube intermediate the glass plate 80 and the fluorescent coating 81. The dichroic coating 79 serves to reflect the color of the fluorescence from the fluorescent material 81 providing a brighter image on the image screen and at the same time functions to filter from the white light of the surrounding region, the specific color of fluorescence thereby increasing the contrast of the image to the outside. It will be discerned that the employment of the dichroic coating achieves suitable viewing of the display presented by the image screen in bright sunlight.

In selecting the specific dichroic coating 79, a determination must first be made of the color of fluorescence from the excited fluorescent coating 81 and the dichroic coating 79 should correspond therewith. It will be obvious that similar results must be achieved by rearranging the disposition of the dichroic coating 79, as for example, by disposing the coating on the outer surface of the glass plate 80. Such a rearrangement would not be beyond the scope of the instant invention.

Figure 13 shows another embodiment of the invention wherein vertical deflection electrodes 110 are disposed on the outer surface of one of the glass face plates 111. A high resistance, transparent coating 112, such as stannic chloride, is coated on the inner surface of the glass surface which is adapted to carry the vertical deflection electrodes 110. In such an arrangement the glass face plate 111 of the tube serves as a dielectric in a two-plate condenser, whereby the changing voltage on the outside appears directly on the inside of the glass. The high resistance coating 112 is adapted to carry away any charges which build up on the inner surface thereof, by virtue of being connected to a source of high voltage as shown diagrammatically in the drawing.

Figures 14 and 15 are directed to the use of groups of fine wires multipled together to form deflection plates. In a particular embodiment it was suggested that one mil wire be wound 20 mils apart in groups of 50 wires separated by 40 mils or more. It was indicated that such arrangement would be more transparent than glass, the light loss being in the nature of five percent or less if the wires are so spaced co-extensively with the entire face of the target. However, it is apparent that under normal conditions it may be necessary to space the groups which form each of the separate deflection plates much in the manner in which the glass deflection plates are presently separated. Such an arrangement is illustrated in Figure 14 wherein there is provided a plurality of wires 120 which are coupled in multiple to form vertical deflection plates 121. As a result the removal of the wires between the various groups which form the deflection plates will have a different transparency value, and will tend to render visible the wires forming the groups. It appears opportune and desirable therefore to provide a uniform spacing co-extensively between the wires, and to this end, a plurality of similar wires 122 are disposed in co-extensive relation with respect to the wires 120 forming the deflection plates 121. The wires 122 are spaced apart from one another in amount substantially equal to the spacing between the individual wires 120.

Another embodiment of the invention is shown in Figure 15 in which arrangement the wires 123 between groups of wires 124 are connected to a RC divider network so that the voltage on the spacing wires 123 is proportional to the position of the wires 124 on the spacing group which is located between the deflection wire groups. Thus, if a spacing gap includes 10 wires the voltage difference between any two adjacent wires will be ten percent of the voltage difference between the adjacent deflection groups.

The compensating RC divider network connected between the wires (*a*) keeps the voltage low between two adjacent wires; (*b*) distributes the voltage equally between the wires.

In the event that the adjacent wires in a spacing group inherently include sufficient capacity to accomplish the above described relationships, then the compensating capacity of the RC network is not required, as shown in Figure 14. If there is sufficient leakage resistance between adjacent wires 120, it is apparent that there will be no requirement for a compensating resistance.

Figure 16 illustrates a modification of the invention for use in aircraft, such as for example, in helicopters. A problem attendant in the landing of a helicopter is the dust cloud which is caused by the air currents generated by the propeller blades. Manifestly, the occurrence of such dust cloud interferes with the visibility of the pilot and makes landings dangerous for this reason. The tube used in a helicopter is adapted to be mounted in front of the pilot and disposed in the hemispherically shaped nose and is shaped in conformity therewith. In this manner, the pilot could be given a visual display sufficient to overcome the aforesaid landing problem.

More specifically, the tube components are identical with those shown and described in connection with Figures 8 and 9 and are shown in a more or less diagrammatic manner in Figure 16. The glass face plates 87 and 88 are curved in two planes so that it may be accommodated in adjacent and parallel relationship with the forward Plexiglas windshield or nose of a helicopter. The other components of the display section of the tube, including the target 81 and the vertical deflection elements 106, are likewise contoured in conformity with the helicopter nose.

It will be obvious to those skilled in the art that many other modifications of the tube contour may be made within the scope of the instant invention. Such other modifications include an arrangement in which a flat cathode ray tube illustrated in Figure 9 is employed with a bend in the middle of approximately forty-five degrees with the line formed by the apices of the angles is substantially parallel to the vertical deflection elements.

Further, it is to be understood that the primary and transition sections of the tube is identical with that described hereinabove.

Figures 17 and 18 illustrate a modification of the vertical deflection element structure as shown and described in connection with Figures 8 and 9. In the modification shown in Figures 17 and 18, the vertical deflection elements 106 may be formed of electrically conductive metal strips and are adapted to be disposed on the glass plate 82 in any of the known manners. Intermediate the individual deflection elements 106, there are formed elongate substantially V-shaped troughs or recesses 84. The recesses 84 may be formed in the glass plate 82 by etching or extrusion. It is considered advantageous in certain applications to provide the recesses 84 with rounded corners to obviate or militate against the corona effect.

What is claimed is:

1. A cathode ray tube comprising a target, an electron beam source means for delivering a beam of electrons along a path in spaced and askew relation with respect to a horizontal marginal edge of said target, means for applying forces to the beam for deflecting the beam to a zone adjacent said target, means for applying focusing forces to the beam prior to entering the zone adjacent said target, and deflection means for applying forces to the beam along its path in said zone causing the beam to be deflected toward and into impingement with said target.

2. A cathode ray tube comprising a target, an electron beam source means for delivering a beam of electrons along a path in spaced offset and substantially parallel relation with respect to a horizontal marginal edge of said target, a first deflection means for applying forces to the beam for deflecting the beam to a zone adjacent said target, means for applying focusing forces to the beam prior to entering the zone adjacent said target including at least a pair of focusing electrodes and a pair of accelerating electrodes disposed between said zone and said first deflection means, and further deflection means for applying forces to the beam in the zone to bend the beam toward and into impingement with said target at successive intervals.

3. A cathode ray tube comprising a target, an electron beam source means for delivering a beam of electrons along a path in spaced and substantially parallel relation with respect to a horizontal marginal edge of said target, means for applying forces to the beam for deflecting the beam to a zone adjacent said target, transition means for applying focusing forces to the beam prior to entering the zone adjacent said target comprising a field defining means, a set of focusing electrodes and a set of accelerating electrodes successively arranged along the beam path, and means for successively applying forces to the beam at different intervals thereof after passage through said transition means for causing the beam to be deflected toward and into registration with correspondingly different points on said target.

4. A cathode ray tube comprising a target, an electron beam source means for delivering a beam of electrons along a path in spaced and substantially parallel relation with respect to a horizontal marginal edge of said target, means for applying forces to the beam for deflecting the beam to a zone adjacent said target, means for applying focusing forces to the beam prior to entering the zone adjacent said target including at least a first pair of electrodes disposed along the beam path in spaced relation to permit passage to the beam therebetween, and a pair of electrodes disposed in spaced relation at a futher point along the beam path, the spacing between the members of the first pair of electrodes being different than the spacing between the second pair of electrodes, and means for sequentially applying deflection forces to the beam causing the beam to be deflected toward and into impingement with said target.

5. A cathode ray tube comprising a target, an electron beam source means for delivering a beam of electrons along a path in spaced and substantially parallel relation with respect to a horizontal marginal edge of said target, means for applying forces to the beam for deflecting the beam to a zone adjacent said target, means for applying focusing forces to the beam prior to entering the zone adjacent said target, a set of deflection electrodes adapted to apply forces to the beam in the zone causing the beam to be deflected toward and into impingement with the target, and means for applying energizing forces to the successive deflection means in a time overlapping manner.

6. A cathode ray tube comprising a target, an electron beam source means for delivering a beam of electrons along a path in spaced and substantially parallel relation with respect to a horizontal marginal edge of said target, means for applying forces to the beam for deflecting the beam to a zone adjacent said target, means for applying focusing forces to the beam prior to entering the zone adjacent said target, and a plurality of optically transparent deflection means interposed between a target and the viewer for applying forces to the beam causing the beam to be deflected toward and impinge upon said target.

7. An electron space discharge device adapted for wall mounting comprising a target, an electron beam source means for delivering a beam of electrons along a path in adjactant spaced relation with respect to a marginal edge of said target, a first deflecting means for applying deflecting forces to the beam in a successive manner initiated at that portion of the path adjacent the marginal edge of said target which is most proximate to the beam source causing the beam to travel toward a zone adjacent said target, means for applying focusing forces to the beam prior to its entrance into the zone adjacent said target, a second deflection means for successively applying deflecting forces to the beam in synchronism with said first deflecting means causing the beam to be deflected toward and into registration with said target.

8. An electron space discharge device comprising a target, an electron beam source means for delivering a beam of electrons along a path in adjacent spaced relation with respect to a marginal edge of said target, a deflection set for applying deflection forces to the beam in a successive manner initiated by the member of said deflection set in most proximate relation with respect to said beam source for causing the beam to be directed toward a zone adjacent said target, means for applying focusing forces to the beam prior to the instant of its penetration into the zone adjacent said target, and means for successively applying deflecting forces to the beam in synchronism with said deflection set causing the beam to be deflected toward and into registration with said target.

9. An electron space discharge device comprising a target, an electron beam source means for delivering a beam of electrons along a path in adjacent spaced relation with respect to a marginal edge of said target, a deflection set adapted to apply deflecting forces to the beam in a successive manner initiated by the member of said deflection set which is most proximate to the beam source causing the beam to be deflected toward a zone adjacent said target, means for applying focusing forces to the beam prior to hte instant of its penetration into the zone adjacent said target, and a set of transparent deflection means for successively applying forces to the beam in synchronism with said deflection set causing the beam to be deflected toward and into impingement with said target.

10. A cathode ray tube comprising a target, a plurality of channel shaped electrodes disposed along and spaced from a marginal edge of said target operative to effect electron beam deflection to a zone adjacent a surface of said target, an electron beam source means arranged to deliver a beam through the channel formed by said electrodes, and means for causing the beam to be successively deflected from said zone toward and into registration with said target.

11. A cathode ray tube comprising a target, an electron beam source means for delivering a beam along a path adjacent a marginal edge of said target, an array of channel shaped electrodes disposed to effect successive deflection of the beam from said path to successive paths in a zone adjacent a surface of said target, and means for effecting deflection of the beam from said zone into registration with said target.

12. An electron discharge device comprising a target, an electron beam source means adapted to deliver a beam along a path adjacent a marginal edge of said target, means for effecting deflection of the beam substantially ninety degrees from its initial path to a second path extending parallel to a surface of said target, means for applying focusing forces to the beam subsequent to its first bend, and means for effecting deflection of the beam from its second path into registration with said target.

13. An electron discharge device comprising a target, an electron beam source means for delivering a beam of electrons along a marginal edge of said target, a deflection set disposed so as to cause the beam to be deflected to a zone adjacent a surface of said target, an optically transparent plate disposed in spaced parallel relation with said surface of said target, and a set of deflection elements formed of an optically transparent, electrically conductive material disposed on said plate for effecting deflection of the beam toward and into registration with said target.

14. A cathode ray tube comprising a target mounted on a glass plate, an electron beam source means for delivering a beam along a first path adjacent a marginal edge of said target, a set of deflection elements disposed in adjacent spaced relation with respect to said marginal edge, an optically transparent plate disposed in parallel spaced relation with respect to said target, and a set of optically transparent deflection elements affixed to the surface of said transparent plate which faces said target.

15. An electron discharge device comprising a target, an electron beam source means for delivering a beam along a path parallel to a marginal edge of said target, a deflection set for applying deflecting forces in an overlapping manner to the beam to cause the beam to travel to a zone adjacent a surface of said target, a plurality of deflection elements for applying deflecting forces in an overlapping manner to the beam to cause the beam to impinge upon the surface of said target, and high resistance material coated between the individual elements of said last mentioned deflection set to effectively eliminate any residual electric charge.

16. A cathode ray tube comprising a target, an electron beam source means for delivering a beam along a path adjacent a marginal edge of said target, a dichroic coating disposed intermediate the viewer and said target, a deflection set for effecting deflection of the beam to a zone adjacent said target, and a deflection set for effecting deflection of the beam into registration with said target.

17. A cathode ray tube comprising a target, an electron beam source means for delivering a beam along a marginal edge of said target, means for selectively deflecting the beam to a zone adjacent a surface of said target, and means for selectively deflecting the beam toward and into impingement with said target, said last mentioned means comprising a plurality of electrically conducting wires formed in individual groups.

18. A cathode ray tube comprising a target, an electron beam source means for delivering a beam along a marginal edge of said target, means for selectively deflecting the beam to a zone adjacent a surface of said target, and a set of deflection elements for selectively deflecting the beam toward and into impingement with said target, each of said deflection elements comprising a group of fine wires disposed in parallel relation with respect to one another and connected in parallel.

19. An electron space discharge device comprising an electron sensitive target, deflection means disposed in spaced relation with said target means to establish a zone therebetween, means for delivering an electron beam into said zone in substantially parallel relation with said target for deflection into registration with said target means by said deflection means, and transition means disposed between said source and said zone comprising a field defining means, a pair of focusing electrodes and a set of accelerating electrodes successively arranged along the beam path to apply beam control forces to the beam in its passage toward said zone.

20. In an electron space discharge device, a target, a beam source for delivering a beam of electrons along a predetermined path, focusing means for applying focusing forces to the beam along said path, including at least a first pair of electrodes disposed in spaced relation along the beam path to permit passage of the beam therebetween, a second pair of electrodes disposed in spaced relation at a further point along the beam path, the spacing between the members of the first and second pair being different; means for applying energizing potentials to said first and second electrode pairs, the potential applied to the second electrode pair being of a higher value than the potentials applied to said first electrode pair, a high voltage control zone comprising at least a first electrode and said target disposed in spaced relation at a further point along the beam path, and means for applying energizing potentials to said electrode to deflect the beam from its path into registration with said target.

21. An electron space discharge device comprising a high voltage zone including an electron sensitive target, an electron beam source for delivering a beam of electrons along a predetermined path, a first deflection means disposed along said path for applying potentials of a low voltage successively to different intervals along said beam path to bend the beam from said path through successive adjacent trajectories adjacent said target, a field defining zone located between said deflection means and said high voltage zone operative to define a voltage field of a value in excess of said low voltage field defined by said first deflection means, a focusing zone located between said field defining zone and said high voltage zone for applying focusing potentials to said beam of a value in excess of said field defining potentials and less than said high voltage potentials, and a second deflection means in said high voltage zone for deflecting said beam from said successive trajectories into registration with correspondingly different points on said target.

22. An electron space discharge device comprising electron beam source means adapted to deliver a substantially cylindrical beam along a first given path, means for applying a deflecting field to the beam to effect bending of the beam to a second path angularly displaced from said first path and to simultaneously compress the beam along one axis to cause same to assume a substantially elliptical cross-section along said second path, and means for applying deflecting forces to the beam at points along the second path in the direction of the major axis of the elliptical cross-section of the beam to reform the beam into a substantially circular cross-section.

23. An electron space discharge device, an electron beam source for delivering a beam of electrons along a predetermined path, a plurality of deflection members successively disposed along said path, and means for applying a signal waveform of changing potential successively to each of the deflection members to bend the beam from the path at successively different points thereon, including control means operable to apply the signal to each succeeding deflection member during the period which is subsequent to initial application of the signal and prior to application of the complete waveform signal to the deflection member which precedes same in the set.

24. An electron space discharge device, an electron sensitive target, an electron beam source for delivering a beam of electrons along a predetermined adjacent said target, a plurality of deflection members successively disposed along said path, and means for applying a waveform signal of changing potential successively to each of the deflection members to bend the beam into correspondingly different points on said target, including control means operable to apply the signal to each succeeding deflection member subsequent to initial application of the signal to the preceding member and prior to application of the complete waveform signal to the preceding deflection member.

25. An electron space discharge device comprising an electron sensitive target, an electron source for delivering an electron beam along a predetermined path, a first set of deflection members disposed along said path, signal control means for applying a waveform signal of changing potential successively to each of the deflection members to bend the beam from the path at successive points and through successive trajectories adjacent said target, including means operable to apply the signal to each succeeding deflection member during the period which is subsequent to initial application of the waveform signal and prior to application of the complete waveform signal to the deflection member preceding same in the set; a second set of deflection means disposed in spaced relation with said target, and means for applying a waveform of changing potential successively to each of the deflection members of the second set including means operable to apply the signal to each succeeding deflection member subsequent to initial application of the signal and prior to application of the complete signal to the deflection member preceding same in the set, and means for controlling application of the waveform signals to said first and second sets of deflection members in a synchronized relation.

26. An electron space discharge device comprising an electron sensitive target, an electron beam source for delivering a beam of electrons along a path in substantially parallel relation with the lower horizontal marginal edge of said target, a first deflection means disposed along said path for applying deflecting forces to the beam at successive intervals along the beam path to bend the beam through correspondingly different trajectories adjacent said target, the initial beam deflection forces being applied immediately adjacent the beam source and successive forces being applied at points successively remote from the beam source, and a second deflection means for thereafter applying forces to the beam to deflect same from said trajectories into registration with correspondingly different points of said target.

27. An electron space discharge device comprising an electron sensitive target, an electron beam source for delivering a beam of electrons along a path in substantially parallel relation with the lower horizontal marginal edge of said target, a plurality of deflection means disposed along said path, means for initially applying negative signals to said deflection means and thereafter successively driving each deflection means positive starting with the deflection means immediately adjacent the beam source and thereafter to each remote deflection means from the beam source, to bend the beam through successive adjacent trajectories, and means for applying forces to the beam to deflect same from said trajectories into registration with correspondingly different points of said target.

28. An electron space discharge device comprising a target, an electron beam source means for delivering a beam along a path adjacent said target, a dichroic coating disposed intermediate the viewer and said target, and a deflection set comprised of a series of deflection members located at spaced intervals along said path for applying deflecting forces to the beam at successive intervals to bend the beam into registration with correspondingly different points on said target.

29. An electron space discharge device comprising an electron beam source for delivering a beam of electrons along a predetermined path, a plurality of deflection means disposed along said path, and means for initially applying focusing potentials to different ones of the deflection means along the beam path to refocus the beam at different points along said path, and means operative to apply deflecting potentials to the successive deflection means along the beam path to bend the beam from the path at correspondingly different points.

30. An electron space discharge device comprising an electron sensitive target, an electron beam source for delivering a beam of electrons along a predetermined path, a plurality of deflection means disposed along said path for deflecting the beam into registration with correspondingly different points on said target, each of said deflection means comprising a group of wires disposed in parallel relation with respect to one another and connected in parallel relation, a set of spaced wires disposed in the gaps between adjacent deflection plates, and voltage responsive means connected between said spacer wires to maintain equal voltage distribution therebetween.

References Cited in the file of this patent

UNITED STATES PATENTS

| | | |
|---|---|---|
| 1,962,873 | Parker | June 12, 1934 |
| 2,059,575 | Gibson | Nov. 3, 1936 |
| 2,071,383 | Balsley | Feb. 23, 1937 |
| 2,090,001 | Hamacher | Aug. 17, 1937 |
| 2,211,844 | Brett | Aug. 20, 1940 |
| 2,307,188 | Bedford | Jan. 5, 1943 |
| 2,363,962 | Heil | Nov. 28, 1944 |
| 2,394,196 | Morgan | Feb. 5, 1946 |
| 2,416,914 | Eaton | Mar. 4, 1947 |
| 2,449,339 | Sziklai | Sept. 14, 1948 |
| 2,449,558 | Lanier | Sept. 21, 1948 |
| 2,513,742 | Pinciroli | July 5, 1950 |
| 2,558,019 | Toulon | June 26, 1951 |
| 2,563,807 | Alfven | Aug. 14, 1951 |
| 2,623,190 | Roth | Dec. 23, 1952 |
| 2,641,699 | Gloess et al. | June 9, 1953 |
| 2,642,535 | Schroeder | June 16, 1953 |
| 2,692,532 | Lawrence | Oct. 26, 1954 |
| 2,711,478 | Krawinkel | June 21, 1955 |
| 2,711,493 | Lawrence | June 21, 1955 |